US011953451B2

(12) United States Patent
De Beenhouwer et al.

(10) Patent No.: US 11,953,451 B2
(45) Date of Patent: Apr. 9, 2024

(54) ITEM INSPECTION BY DYNAMIC SELECTION OF PROJECTION ANGLE

(71) Applicants: UNIVERSITEIT ANTWERPEN, Antwerp (BE); IMEC VZW, Leuven (BE)

(72) Inventors: Jan De Beenhouwer, Geraardsbergen (BE); Jan Sijbers, Duffel (BE)

(73) Assignees: UNIVERSITEIT ANTWERPEN, Antwerp (BE); IMEC VZW, Leuven (BE)

(*) Notice: Subject to any disclaimer, the term of this patent is extended or adjusted under 35 U.S.C. 154(b) by 616 days.

(21) Appl. No.: 17/251,996

(22) PCT Filed: Jul. 1, 2019

(86) PCT No.: PCT/EP2019/067584
§ 371 (c)(1),
(2) Date: Dec. 14, 2020

(87) PCT Pub. No.: WO2020/002704
PCT Pub. Date: Jan. 2, 2020

(65) Prior Publication Data
US 2021/0270755 A1 Sep. 2, 2021

(30) Foreign Application Priority Data

Jun. 29, 2018 (EP) .................................. 18180893
Apr. 2, 2019 (EP) .................................. 19166687

(51) Int. Cl.
G06K 9/00 (2022.01)
G01N 23/04 (2018.01)
(Continued)

(52) U.S. Cl.
CPC ............. G01N 23/04 (2013.01); G06N 20/00 (2019.01); G06T 7/001 (2013.01);
(Continued)

(58) Field of Classification Search
CPC ................. G01N 23/04; G01N 23/046; G01N 2223/419; G01N 2223/305;
(Continued)

(56) References Cited

U.S. PATENT DOCUMENTS 9,619,902 B2* 4/2017 Batenburg ........... G01N 23/046
2010/0322494 A1 12/2010 Fauver et al.
(Continued)

FOREIGN PATENT DOCUMENTS

WO 2016182550 A1 11/2016
WO 2016204402 A1 12/2016
(Continued)

OTHER PUBLICATIONS

Jeon, H., Youn, H., Kim, J. S., Nam, J., Lee, J., Lee, J., ... & Kim, D. (2017). Generation of polychromatic projection for dedicated breast computed tomography simulation using anthropomorphic numerical phantom. PloS one, 12(11), e0187242. (Year: 2017).*
(Continued)

Primary Examiner — Emily C Terrell
Assistant Examiner — Kevin M Coomber
(74) Attorney, Agent, or Firm — Amster, Rothstein & Ebenstein LLP

(57) ABSTRACT

A method is provided for inspection of an item comprising acquiring a projection image of the item using a radiation imaging system and obtaining a plurality of simulated projection images of the item or a component thereof, based on a simulation of a numerical three-dimensional model. A relative orientation of the item with respect to the imaging system is determined by comparing the projection image to the plurality of simulated images, and at least one angle of rotation is determined by taking into account a viewing angle and the relative orientation. The method further comprises moving the item and/or the imaging system in accor-
(Continued)

dance with the at least one angle of rotation and acquiring a further projection image of the item.

20 Claims, 7 Drawing Sheets

(51) Int. Cl.
*G06N 20/00* (2019.01)
*G06T 7/00* (2017.01)

(52) U.S. Cl.
CPC . *G01N 2223/645* (2013.01); *G01N 2223/646* (2013.01); *G06T 2207/20081* (2013.01); *G06T 2207/30108* (2013.01)

(58) Field of Classification Search
CPC ..... G01N 2223/3306; G01N 2223/645; G01N 2223/646; G01N 2021/1787; G06T 2207/10081; G06T 11/003; G06T 11/008; G06T 2207/10116; G06T 2207/10072; G06T 2211/424; G06T 7/001; G06T 2207/20081; G06T 2207/10084; G06T 11/005; G06T 2207/30108; G06T 7/0004; G06T 15/08; G06T 17/00; G03F 7/705; G03F 7/7065; G06N 20/00; G01B 15/06

See application file for complete search history.

(56) References Cited

U.S. PATENT DOCUMENTS

| | | |
|---|---|---|
| 2011/0158492 A1 | 6/2011 | Jarisch |
| 2012/0183121 A1 | 7/2012 | Perrin et al. |
| 2018/0150929 A1 | 5/2018 | Pheiffer et al. |
| 2020/0250861 A1* | 8/2020 | Lötjönen ............... G06T 11/008 |

FOREIGN PATENT DOCUMENTS

| | | |
|---|---|---|
| WO | 2017013573 A1 | 1/2017 |
| WO | 2020002705 A1 | 1/2020 |

OTHER PUBLICATIONS

Madrigal, C. A., Branch, J. W., Restrepo, A., & Mery, D. (2017). A Method for Automatic Surface Inspection Using a Model-Based 3D Descriptor. Sensors (Basel, Switzerland), 17(10), 2262. https://doi.org/10.3390/s17102262 (Year: 2017).*

Engel et al., "Degradation of the Urease Inhibitor NBPT as Affected by Soil pH," Soil Science Society of America 1 Journal, vol. 79, Nov. 6, 2015, pp. 1674-1683.

Heinzl C. Quantitative inspection of complex composite aeronautic parts using advanced x-ray techniques. Nov. 27, 2015, 116 pages. Retrived from https://cordis.europa.eu/docs/results/314/314562/final1-314562-quicom-final-report-publishable-.pdf.

International Search Report and Written Opinion dated Oct. 17, 2019 from PCT International Appln. PCT/EP2019/067584.

* cited by examiner

ITEM INSPECTION BY DYNAMIC SELECTION OF PROJECTION ANGLE

CROSS-REFERENCE TO RELATED APPLICATIONS

This application is a U.S. national stage entry under 35 U.S.C. § 371 of PCT International Patent Application No. PCT/EP2019/067584, filed Jul. 1, 2019, which claims priority to European Patent Application No. 18180893.2, filed Jun. 29, 2018, and to European Patent Application No. 19166687.4, filed Apr. 2, 2019, the contents of each of which are incorporated herein by reference in their entirety.

FIELD OF THE INVENTION

The present invention relates to the field of radiation imaging for testing and/or quality assurance of items, and, more specifically, the invention relates to a method and system for non-destructive item inspection by projection imaging, e.g. by terahertz imaging or ionizing radiation imaging.

BACKGROUND OF THE INVENTION

X-ray computed tomography (CT) can be used, as known in the art, for non-destructive testing and/or quality control in a wide range of industrial applications. In a typical CT-based quality control workflow known in the art, hundreds to thousands of equiangular X-ray projections are acquired of the sample to be inspected to obtain volumetric information of the object. However, such approach can suffer from long acquisition times, which reduces the usability and feasibility of this method in an in-line application for quality control, e.g. for defect inspection or metrology.

The use of simple two-dimensional (2D) X-ray radiography is also known in the art for inspection purposes. It is an advantage of 2D X-ray inspection that it is much faster than tomography, but, obviously, cannot provide the same comprehensive level of information as a full three-dimensional (3D) reconstruction.

Hybrid X-ray based inspection approaches have been proposed that are faster than 3D reconstruction, but also more accurate than a straightforward application of 2D X-ray radiography. For example, simulated projection images of a computer-aided design (CAD) model of an item can be compared to corresponding projection images acquired from the physical item to detect flaws, i.e. deviations from the model, and/or to derive characteristics of the external and internal shape of the item. It is also known in the art to estimate parameters of the CAD model for such comparison or to determine a deviation from a nominal geometry directly from multiple projections.

WO2019030449 discloses a method and a device for non-destructive inspection of mechanical parts by radiographic imaging. Therein, at least one real image of a part to be inspected is acquired that is likely to contain indications of potential defects. A 2D-3D resetting of a 3D model of the inspected part is performed to estimate its 3D pose during the radiographic image acquisition of the real image. This estimated pose is then used for a simulation of the operating conditions for the acquisition of the real image to generate a reference image without defects of the part. An image processing module generates first and second feature vectors for each pixel of the real image and the reference image, respectively. Upon comparing the first and second feature vectors for each pixel of the real image and the reference image, a defect map is deduced for the inspected part.

This method has the disadvantage that many real images of the inspected part have to be acquired before a potential defect can be imaged with good visibility, such that the comparison of feature vectors results in reliable defect maps. Repeated trial and error to find a good viewing angle for the real image of the inspected part, which may be different for each type of defect, can be problematic in inline industrial processes for which a high throughput is desired. Furthermore, comparing the feature vectors for each pixel of the real and the reference image represents a computationally expensive approach if high-resolution radiographic images are used to resolve very fine defects. This may prevent the method to be implemented in industrial manufacturing or handling environments for which near real-time defect identification or classification are sought.

SUMMARY OF THE INVENTION

It is an object of embodiments of the present invention to provide good and efficient means and methods for item inspection using projection imaging, e.g. X-ray imaging, gamma ray imaging, optical transmission imaging and/or terahertz imaging.

A device and method in accordance with embodiments of the present invention achieves the above objective.

It is an advantage of embodiments of the present invention that a good speed and a good accuracy can be achieved in item inspection, e.g. for an offline, an online, an inline or an at-line non-destructive testing, quality control, fault detection, and/or other industrial inspection process.

It is an advantage of embodiments of the present invention that only a limited number, preferably an optimal number, of projection images are needed to achieve sufficient information for accurate item inspection. For example, based on prior-knowledge of possible regions in the item where defects may occur, e.g. one or more predefined regions of interest, a specific geometry or geometries for image acquisition, e.g. a viewing angle, not necessarily limited to a single angle, e.g. a 3D angle, and not necessarily limited to only angular components, e.g. possibly including a position of a radiation source with respect to the object, can be determined that would allow a good detection and/or characterization of defects in the item.

It is an advantage of an approach in accordance with embodiments of the present invention that non-destructive 3D inspection of the item can be achieved with a limited number of projection images, e.g. without requiring a tomographic reconstruction of the images. This may be achieved by relying on a 3D model of the item or at least one of its components, e.g. from readily available CAD data, to simulate projection images and correlating and/or comparing the simulated projection images to the acquired projection images. Thus, faults in the item, such as misaligned components in an assembly of item components, can be assessed in 3D based on the (limited) projection data.

It is an advantage of embodiments of the present invention that projection geometry parameters for acquiring a limited number of projection images can be quickly determined, e.g. in an insubstantial amount of time such as to allow application in an inline or at-line process, based on prior knowledge, e.g. of a CAD model of the item that defines its nominal geometry and/or further information regarding the item, possible defects thereof and/or regions of the item where such defects could occur.

It is an advantage of limiting the iterative procedure in at least one iteration thereof to a region of interest (ROI), determined from the results of a previous iteration, that faults involving a missing component can be easily detected. For example, the ROI can easily be defined by projection only, such that a detailed search for the missing component in the image data can be avoided. However, the further step of using the detailed model of the item of interest allows the detection of a defective part in the ROI. Thus, the computational cost can be substantially reduced.

In a first aspect, the present invention relates to a non-destructive method for inspection of at least one item. The method comprises acquiring a projection image of the item or items using a radiation imaging system. The method comprises obtaining a plurality of simulated projection images of the (or each) item or at least one component thereof, based on a simulation of a numerical three-dimensional model of the item or the at least one item component, in which at least one geometric parameter relating to the relative orientation between the simulated item, a simulated radiation source, and a simulated detection plane varies over the plurality of simulated projection images. The method comprises determining a relative orientation of the (or each) item with respect to the radiation imaging system, in which this determining of the relative orientation comprises comparing the projection image to the plurality of simulated projection images. The method comprises determining at least one angle of rotation (e.g. one or more angles of rotation, optionally also one or more components of translation) taking a viewing angle and the relative orientation into account. The method comprises moving the item and/or the imaging system (e.g. relative to each other) in accordance with the at least one angle of rotation. The method comprises acquiring a further projection image of the item, after the step of moving the item, such that the further projection image corresponds to a view of the item from the viewing angle.

In a method in accordance with embodiments of the present invention, the steps of determining the relative orientation, determining the at least one angle of rotation, moving the item and acquiring a further projection image may be repeated (in loops) for one or more further viewing angles, in which the last acquired further projection image, or a combination of previously acquired further projection images, is used as the projection image on which the steps of determining the relative orientation, determining the at least one angle of rotation, moving the item and acquiring a further projection image in the following repetition loop are based.

In a method in accordance with embodiments of the present invention, obtaining the plurality of simulated projection images may comprise obtaining a library of the plurality of simulated projection images, wherein said plurality of simulated projection images is precomputed based on said three-dimensional numerical model.

In a method in accordance with embodiments of the present invention, obtaining the plurality of simulated projection images may comprise obtaining said three-dimensional numerical model of said object and simulating said plurality of projection images based on said numerical model of said object for a plurality of values of the at least one geometric parameter.

In a method in accordance with embodiments of the present invention, the step of simulating the plurality of simulated projection images may comprise virtually casting polychromatic rays of ionizing radiation from a source through the numerical model onto a simulated image detector, wherein geometric and spectral parameters of the radiation imaging system substantially correspond to those used for virtually casting said polychromatic rays.

A method in accordance with embodiments of the present invention may comprise determining the viewing angle and/or one or more further viewing angles corresponding to, or clustered around, one or more angles of good visibility of the item.

In a method in accordance with embodiments of the present invention, the determining of the viewing angle and/or one or more further viewing angles may comprise calculating the one or more viewing angles by optimization of a quality measure in a two-dimensional region of interest in the plurality of simulated projection images over the at least one geometric parameter. Alternatively, or additionally, a quality measure in a three-dimensional region of interest in the numerical model may be used, which is re-projected onto a corresponding two-dimensional region in the plurality of simulated projection images over the at least one geometric parameter.

The region of interest may relate to portions of the item that are known, a-priori, for their relevance in a manufacturing process of the item, for example known to be prone to defects, e.g. welds. The region of interest may also relate to components from which the item is assembled.

In a method in accordance with embodiments of the present invention, the determining of the viewing angle and/or one or more further viewing angles may comprise applying a machine learning algorithm to the plurality of simulated projection images over the at least one geometric for predicting, as outputs, the one or more viewing angles in respect of the item to be inspected.

In a method in accordance with embodiments of the present invention, the determining of the relative orientation of the item with respect to the radiation imaging system may comprise determining a two-dimensional transformation between the projection image and a simulated projection image selected from the plurality of simulated projection images, in which this transformation is determined by numerically optimizing an image similarity measure between the projection image and the simulated projection image, in which one or more parameters of said two-dimensional transformation are indicative of a translation and/or rotation of the item in the projection image plane. Alternatively, a two-dimensional transformation between the projection image and a simulated projection image selected from the plurality of simulated projection images may be determined by applying the projection image(s) as input(s) to a machine learning algorithm that has been trained to predict the two-dimensional transformation using the plurality of simulated projection images as training data.

In a method in accordance with embodiments of the present invention, the determining of the relative orientation of the item may comprise transforming the projection image by the two-dimensional transformation to obtain a transformed projection image in which the item is substantially positioned and oriented as in the selected simulated projection image.

In a method in accordance with embodiments of the present invention, the determining of the relative orientation of the item may comprise determining a position and orientation of the item in three-dimensional space taking the one or more parameters of the two-dimensional transformation into account. For methods in which the two-dimensional transformation is predicted by a machine learning algorithm, the same machine learning algorithm can be configured to also predict a position and orientation of the item in three-dimensional space.

In a method in accordance with embodiments of the present invention, an image similarity measure between the transformed projection image and the plurality of simulated projection images may be optimized, as function of the at least one geometric parameter, to determine the at least one geometric parameter. Alternatively, the at least one geometric parameter may be determined as the predicted output of said machine learning algorithm presented with the acquired projection image(s), wherein the machine learning algorithm has been trained to predict the at least one geometric parameter using the plurality of simulated projection images and the associated geometrical parameters as training data.

In a method in accordance with embodiments of the present invention, the position and orientation of the item in three-dimensional space may be determined by taking the at least one geometric parameter and the one or more parameters of the two-dimensional transform into account.

In a method in accordance with embodiments of the present invention, determining the at least one angle of rotation may also comprise determining at least one translation component.

In a method in accordance with embodiments of the present invention, moving the item and/or the imaging system, e.g. relative to each other, may comprise moving the item and/or the imaging system in accordance with the at least one angle of rotation and the at least one translation component.

In a method in accordance with embodiments of the present invention, acquiring the projection image of the item may comprise acquiring the projection image in which a plurality of items are imaged, the method further comprising determining the relative orientation and/or position of each of the plurality of items separately.

In a method in accordance with embodiments of the present invention, a further projection image may be acquired for each of the plurality of items separately after respectively moving the item and/or imaging system to take each of the determined relative orientations and/or positions into account.

In a method in accordance with embodiments of the present invention, the at least one geometric parameter relating to the relative orientation between the simulated item, a simulated radiation source and a simulated detection plane and which geometric parameter varies over the plurality of simulated projection images may comprise at least a first geometric parameter corresponding to a rotational and/or translational degree of freedom for moving, i.e. in the step of moving, the item and/or the imaging system.

In a method in accordance with embodiments of the present invention, the at least one geometric parameter may comprise at least a second geometric parameter corresponding to a rotational and/or translational degree of freedom of the item with respect to the imaging system that is not controlled by said step of moving.

In a method in accordance with embodiments of the present invention, the at least one geometric parameter may be output. For example, the method may comprise outputting at least one determined rotation angle or relative orientation and/or translation of the item with respect to the radiation imaging system.

In a method in accordance with embodiments of the present invention, at least one quality measure between transformed projection image and one or more of the plurality of simulation projection images may be output, for instance for the selected simulation projection images. The step of outputting may comprise defining a region of interest in each corresponding pair of (selected) simulated and acquired projection image.

In a method in accordance with embodiments of the present invention, the method may comprise, as a further step, classifying the inspected item based on classification datasets previously acquired by applying the method in accordance with embodiments to a plurality of such similar items. For example, the step of classifying may comprise a linear discriminant analysis of the quality measure to classify each item. Classifying may comprise the step of classifying an inspected item according to one or more defects that are present in one or more item components, i.e. classifying defective or missing components.

In a second aspect, the present invention relates to a system for inspection of an item(s). The system comprises a radiation imaging system for acquiring a projection image of the item, a simulator or a precomputed library, for providing a plurality of simulated projection images of the item based on a simulation of a numerical three-dimensional model of the item, in which at least one geometric parameter relating to the relative orientation between the simulated item, a simulated radiation source and a simulated detection plane varies over the plurality of simulated projection images, and a processor for determining a relative orientation (optionally also a relative position) of the item with respect to the radiation imaging system. Determining the relative orientation comprises comparing the projection image to the plurality of simulated projection images. The processor is adapted for determining at least one angle of rotation (optionally also one or more translation components) taking a viewing angle and the determined relative orientation (and/or position) into account. The system comprises an actuator, controlled by the processor, for moving the item and/or the imaging system, e.g. relative to each other, in accordance with the determined at least one angle of rotation (and/or translation components) such as to position and/or orient the item and/or the imaging system with respect to each other to acquire a further projection image of the item corresponding to a view of the item from the viewing angle.

In a system in accordance with embodiments of the present invention, the processor may be adapted for repeatedly determining the relative orientation, determining the at least one angle of rotation, moving the item and acquiring a further projection image for one or more further viewing angles, in which the last acquired further projection image is used as the projection image on which to operate in the following repetition loop.

In a system in accordance with embodiments of the present invention, the processor may be adapted for determining a two-dimensional transformation between the projection image and a simulated projection image selected from the plurality of simulated projection images, said transformation being determined by numerically optimizing an image similarity measure between the projection image and the simulated projection image, wherein one or more parameters of said two-dimensional transformation are indicative of a translation and/or rotation of the item in the projection image plane.

In a system in accordance with embodiments of the present invention, the processor may be adapted for transforming the projection image by the two-dimensional transformation to obtain a transformed projection image in which the item is substantially positioned and oriented as in the selected simulated projection image, and for determining a position and orientation of the item in three-dimensional space taking the one or more parameters of the two-dimensional transformation into account.

In a system in accordance with embodiments of the present invention, the processor may be adapted for optimizing an image similarity measure between the transformed projection image and the plurality of simulated projection images, as function of the at least one geometric parameter, to determine the at least one geometric parameter, and for determining the position and orientation of the item in three-dimensional space by taking the at least one geometric parameter and the one or more parameters of said two-dimensional transformation into account.

In a further aspect, the present invention relates to a use of a method or system in accordance with embodiments of the present invention for quality control, testing, classification, selection, metrology, and/or sorting of each item of a plurality of items in a manufacturing or handling environment for manufacturing or manipulating the plurality of items.

A use in accordance with embodiments of this aspect of the invention may be a use in inline, at-line, online or offline inspection of the item in an industrial process. For example, inline may refer to a direct evaluation of an item in an industrial line, e.g. on a conveyor belt or similar mechanism for processing items in a flow, online may refer to the testing of, for example a sample of the items, by diverting the items of this sample group from a primary industrial line to a secondary line for testing the items, e.g. having a lower throughput suitable for the sampled subpopulation taken from the items on the primary line, at-line and offline may refer to the extraction of a sample from the primary line for testing, without requiring a processing of the extracted samples in an automated line. A distinction between at-line and offline testing may reside in whether the sample is tested in the industrial context of the line, e.g. in the same facility, or, for the latter, in a dedicated facility, e.g. a laboratory.

In a yet further aspect, the present invention relates to a computer program product for implementing, when executed on a processor operatively connected to a radiation imaging system to control an acquisition of projection images and to an actuator for moving the item under inspection relative to the imaging system, a method in accordance with embodiments of the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
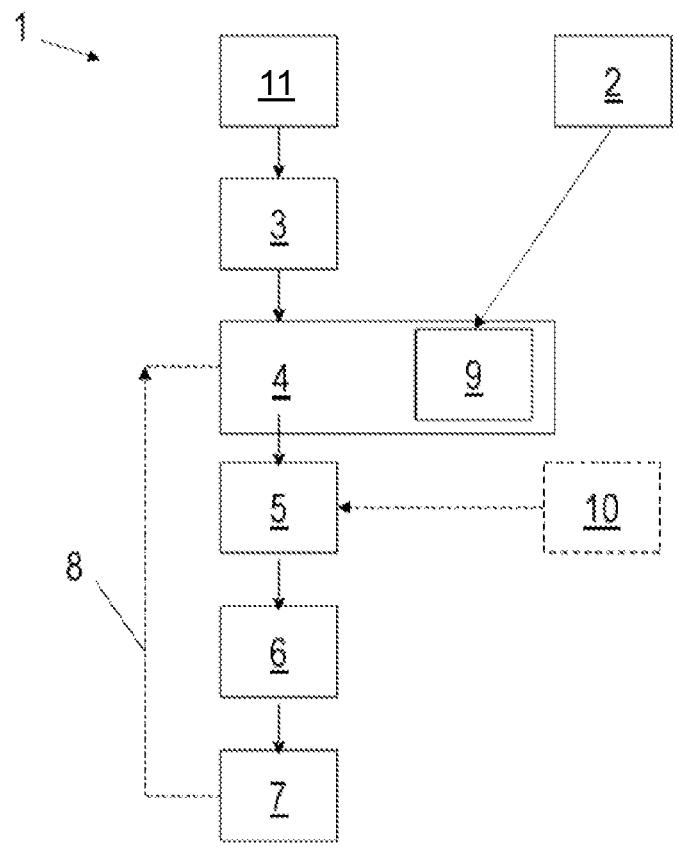
FIG. 1 shows a method in accordance with embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a method for inspection of an item, e.g. for inline or offline inspection of an item in an industrial process. Item inspection in an industrial process relates to a detailed examination to detect defects, flaws, dimensional variations, discontinuities, inclusions, deformations and such. The method may be a computer-implemented method.

The method comprises acquiring a projection image of the item using a radiation imaging system. Radiographic projections for item inspection typically use a type of radiation under which the inspected item appears translucent as this allows for a reliable examination of the deep interior volume of the inspected item where surface-sensitive interrogation by radiation, such as camera imaging of the item's outer boundary at visible wavelengths, may be insufficient to provide this detailed information. Radiographic projections using visible light are not necessary excluded if the inspected item is at least partially translucent to visible light, for instance a transparent or semi-transparent item comprising glass, transparent polymers, or other non-opaque materials.

The method comprises obtaining a plurality of simulated projection images of the item based on a simulation of a numerical three-dimensional model of the item, in which at least one geometric parameter varies over the plurality of simulated projection images. The at least one geometric parameter relates to, e.g. is indicative of, e.g. is, the relative orientation between the simulated item, a simulated radiation source and a simulated detection plane. A numerical three-dimensional model of the item may be a 3D solid model (virtual) representation, e.g. solid model representation in a computer, of the item, which may comprise one or more components of which the item is assembled. The numerical 3D solid model may correspond to a three-dimensional computer-aided design (CAD) model, e.g. used in designing and/or manufacturing the item. The CAD model is a virtual model representation of the item or of an assembly of components from which the item is built. For instance, the CAD model is an assembly model which comprises one or more components of the item as assembly parts together with their geometrical or mechanical interrelations and constraints. For example, the CAD model may take variations in alignment and/or orientation of a plurality of components with respect to each other into account. The CAD model may virtually represent the item, and its components if applicable, as a volume mesh, as a polygon mesh with implicit volume definition, via a collection of surfaces or curves to represent the item's boundaries, or as a constructive solid geometry (CSG modelling). The different representations may be interconverted. A CAD model of the item may be stored in many different available formats, for example, the CAD model in a stereolithography (STL) format. The 3D numerical solid model may further comprise a statistical shape model describing the shape of the item and/or of its components. For example, the CAD model may be a parametric model which parametrizes the item shape boundary via parametric curves and/or surfaces, or via parametrized mesh deformations. Furthermore, the solid model typically comprises material property data in relation to the volume of the virtually represented item. The material property data may be representative of matter-radiation interactions of the constituent materials of the model, e.g. included in the model, as metadata attached to the model or as a separate data structure indexing the components of the modelled item. For example, in a particularly simple embodiment, embodiments not being limited thereto, it may be assumed that the modelled item has a uniform material composition and uniform (radio)density and can be described either directly by its boundary coordinates or with parameters describing boundaries indirectly (e.g. sphere radius and location). For CAD models of the item, other data may be associated with the virtual representation, for instance expected or statistically estimated manufacturing tolerances of dimension, angles, etc.

The method comprises determining a relative orientation, optionally also a relative position, of the item with respect to the radiation imaging system, in which this step of determining the relative orientation comprises comparing the projection image to the plurality of simulated projection images. The method comprises determining at least one angle of rotation, optionally also one or more translation components, taking a viewing angle and the relative orientation, optionally also the relative position, into account and moving the item and/or the imaging system in accordance with the at least one angle of rotation. The method comprises acquiring a further projection image of the item, after the step of moving the item, such that the further projection image corresponds to a view of the item from the viewing angle. As discussed in detail hereinbelow, the method may iterate over a plurality of desired viewing angles, which may be predetermined, specified by a user or computed.

Thus, a method is disclosed to dynamically acquire one or more projection images from predetermined viewing angles, when a position and/or orientation of the item is a-priori unknown, e.g. only known up to a predetermined precision and/or only known for some parameters of the position and/or orientation while unknown or only known up to a predetermined precision for at least one other parameter of the position and/or orientation, for example, (without limitation) wherein at least one parameter of the position and/or orientation may be stochastically distributed. The method allows a dynamic estimation the unknown object orientation and/or position. Such model-based inspection approach, e.g. based on simulated projection images obtained by radiation transport simulation through a CAD model, shape model or other model that defines the outline and/or internal (nominal) structure of the objection, may advantageously provide fast, e.g. near real-time, projection-based inspection.

Referring to FIG. 1, a method 1 for inspection of an item in accordance with embodiments of the present invention is shown.

The method comprises acquiring 2 a projection image of the item using a radiation imaging system. The radiation imaging system may comprise an ionizing radiation imaging system, or another imaging system using projection imaging, e.g. terahertz imaging or optical transmission imaging. The radiation imaging system may comprise a radiation source for projecting radiation through the item and an imaging detector for generating a two-dimensional image when the radiation transported through the item impinges on the imaging detector. The radiation imaging system may comprise an actuator for moving the radiation source and the imaging detector, e.g. rotating the source and detector around the item to be imaged. The radiation imaging system may comprise an actuator for moving the item, e.g. a rotation stage, such as a turntable, and/or a translation stage.

The method comprises obtaining 3 a plurality of simulated projection images of the item based on a simulation of a numerical three-dimensional model of the item, such as a CAD model. The numerical model may comprise obtaining a computer-aided design model of the item specifying the internal structure of the item. The numerical model may comprise or may be annotated with material property data representative of matter-radiation interactions of constituent materials of the object, e.g. for use in the simulation.

At least one geometric parameter varies over the plurality of simulated projection images. The at least one geometric parameter relates to the relative orientation between the simulated item, a simulated radiation source and a simulated detection plane. For example, the at least one geometric parameter may comprise one, two or three angles defining an orientation of the item, e.g. Euler angles. The at least one geometric parameter may comprise one, two or three distances defining a position of the item, e.g. a translation vector in a three-dimensional space.

Preferably, the at least one geometric parameter comprises at least an angle of rotation of the item around an axis that is oriented parallel to the imaging plane, such that the plurality of simulated projection images contain complementary image information of the item that cannot be obtained by any single one of the simulated projection images.

Obtaining 3 the plurality of simulated projection images may comprise obtaining a library of the plurality of simulated projection images, wherein the plurality of simulated projection images is precomputed based on the three-dimensional numerical model 11.

Obtaining the plurality of simulated projection images may comprise obtaining the three-dimensional numerical model of the item and simulating the plurality of projection images based on the numerical model of the item for a plurality of values of the at least one geometric parameter. Thus, the method may comprise precomputing the library, or the method may comprise computing a simulated projection image for a value or several values of the at least one geometric parameter In the step of comparing the projection image to the plurality of simulated projection images, e.g. an on-the-fly simulation. The step of simulating the plurality of simulated projection images may comprise virtually casting polychromatic rays of ionizing radiation from a source through the numerical model onto a simulated image detector, in which the radiation imaging system substantially corresponds to geometric and spectral parameters used for virtually casting said polychromatic rays. For example, the geometric parameters of the simulation may take a detector size and/or detector element spacing, a source-detector distance, a (at least approximative) source-item distance and/or a radiation spectrum of the radiation imaging system into account.

The spectral distribution of the polychromatic rays may be measured (e.g. based on measurements obtained for the radiation imaging system used for acquiring the projection images in the method) or estimated by known techniques. The spectral distribution may also be determined inline, e.g. by including parameters of the spectral distribution in the iterative approach described further hereinbelow and by minimizing a discrepancy between intensity values of the measured and simulated data.

Likewise, the geometric parameters describing a geometrical configuration of the radiation imaging system may be constrained by preliminary or intermediate measurements. For example, the geometrical parameters may be determined using the 3D model, or in a preliminary calibration step using CAD modem data of a calibration phantom, the detector, the phantom, and the position of the source. For example, such parameters may be optimized using a Hill climbing algorithm.

Thus, the method may also comprise measuring or estimating a spectral distribution of the polychromatic rays emitted by a radiation source of the radiation imaging system. The method may comprise measuring geometric parameters of the radiation imaging system for use in said simulation.

The method comprises determining 4 a relative orientation of the item with respect to the radiation imaging system.

Determining the relative orientation (and possibly also a relative position) comprises comparing the projection image to the plurality of simulated projection images. Prior information on a variation of relative orientation and/or position of the item encountered in practice may be taken into account in determining the relative orientation.

Determining 4 the relative orientation of the item with respect to the radiation imaging system may comprise determining a two-dimensional transformation between the projection image and a simulated projection image selected from the plurality of simulated projection images. For example, the simulated projection image may be selected on the basis of a first guess (e.g. a default) or approximation of the at least one geometric parameter. For example, the at least one geometric parameter may comprise an angle of rotation of the item around an axis that is parallel to the imaging plane, and the a-priori unknown orientation of the item when imaged may be assumed to be near a default value of this angle, e.g. may be randomly distributed around a central value of this angle. Furthermore, the method may comprise an iterative optimization, in which a more accurate estimate of the at least one geometric parameter is obtained in the following steps, which may be used to repeat the selection step. This process may be repeated for one or more iterations. Alternatively, the selection may be based on optimization of an image similarity metric between the projection image and a simulated projection image over the at least one geometric parameter.

The two-dimensional transformation between the projection image and the selected simulated projection image may be determined by numerically optimizing an image similarity measure, such as mutual information or another quantitative measure of similarity, between the projection image and the selected simulated projection image, in which one or more parameters of the two-dimensional transformation are indicative of a translation and/or rotation of the item in the projection image plane. For example, the one or more parameters may comprise affine transformation parameters, scaling parameters, 2D translation parameters and/or 2D rotation parameters.

Determining 4 the relative orientation of the item may further comprise transforming the projection image by the two-dimensional transformation to obtain a transformed projection image in which the item is substantially positioned and oriented as in the selected simulated projection image.

Determining 4 the relative orientation of the item may comprise determining a position and orientation of the item in three-dimensional space taking the one or more parameters of the two-dimensional transformation into account.

For example, the position and orientation of the item in 3D may be determined as a point on (or sufficiently near) a line connecting a source position in 3D and a 3D vector representative of the position and orientation of the image of the item on a detector plane. The position along this line may be determined by comparing the image to the plurality of simulated images, e.g. by advantageously using a different scaling of the item for different positions along the line and/or differences in pixel values into account. When the method is repeated for a plurality of projection images taken from a plurality of different viewing geometries, e.g. angles, such lines (obtainable for each projection image) may be numerically intersected to determine (or improve a previous estimate of) the position and orientation in 3D. If a plurality of projection images is acquired at different angles, a number of projection images may lie in the range 2 to 20, e.g. in the range of 2 to 15, e.g. in the range of 2 to 10, such as in the range of 2 to 8, e.g. in the range of 2 to 6, e.g. in the range of 2 to 5, e.g. 3 or 4. Thus, the number of required image acquisitions may be optimized, e.g. reduced, to obtain good visibility of the item by a small number of projection angles for acquiring projection images (e.g. such that a good complementarity of the images is obtained).

For example, an image similarity measure, such as the structure similarity index measure, between the transformed projection image and the plurality of simulated projection images may be optimized, as function of the at least one geometric parameter, to determine the at least one geometric parameter. An image similarity measure may be pixel-based and assessed over the fill transformed projection image as reference, or may use only partial information of transformed projection image, then acting as reduced reference. Other similarity measures include visual information fidelity, mean-square error, or (peak) signal-to-noise ratio, iterative reweighted linear least squares, or a Student-t statistic.

A fast matching procedure between the transformed projection image and the plurality of simulated projection images to determine the at least one geometrical parameter may be further rely on feature indexing methods, such as typically used in the information retrieval field. For example, a scale-covariant detector of regions of interest may be implemented based on a Difference-of-Gaussian filter, a scale-invariant feature transform (SIFT) descriptor and a fast matcher based on kd-tree search with priority queue for establishing local correspondences.

Furthermore, in accordance with particular embodiments of the present invention, a matching procedure between the transformed projection image and the plurality of simulated projection images to determine the at least one geometrical parameter may comprise applying perturbation theory (in Radon projection space) to the simulation of the radiation imaging, e.g. within a simulator. Based on perturbation theory, changes from the nominal projection values (e.g. computed by a nonlinear forward model) may be linearized in embodiments in which it can be assumed that the surface of the item or the at least one item component is sufficiently smooth. As a result, the steps of comparing the transformed projection image to the plurality of simulated projection images and selecting a simulated projection image from the plurality of simulated projection images by way of optimizing a similarity measure may then be performed more efficiently between the acquired projection image and the perturbed, linearized simulation projection images.

Alternatively, in accordance with particular embodiments of the present invention, an iterative, robust matching procedure between the transformed projection image and the plurality of simulated projection images to determine the at least one geometrical parameter may be implemented. The iterative, robust matching procedure may be used for fine-tuning a viewing angle. In a multi-scale variant, the simulated projection images may be precomputed, and divided into different levels of detail, e.g. such that the alignment procedure via a two-dimensional transformation can be performed in an iterative way, e.g. from a coarse-grained alignment to a more precise alignment. The iterative procedure may be organized in a first stage where only a relatively small number of projection images are simulated, e.g. for an initial fast alignment. In a second stage, a three-dimensional region of interest, defined in the 3D numerical model or at least defined in a coordinate space that can be transformed to the coordinate space of the 3D model by a predetermined transformation, e.g. in a 3D mesh structure or cubic volume defined in terms of the coordinate frame of the 3D model, may be taken into account to focus the procedure on a region of the item on which quality control need to be performed. In a third stage, only one item component that is subject to inspection may be taken into account. In other words, the iterative procedure may involve different 3D models or sub-models in different steps, e.g. starting from a coarse model of the item being inspected, then focusing on a specific region of the item that is of interest, and finally using a detailed model of the item or item component. The region of interest (ROI) may be predetermined, e.g. defined as a 3D region in the 3D model, as a region where a component of interest in the item is to be found and/or where possible defects can be expected. For example, the ROI can be determined such as to discriminate between defective and non-defective items. Furthermore, by limiting the steps of comparing and/or selecting, e.g. in at least one step of the iterative procedure, however not necessarily limited to only a part of the iterative procedure, e.g. possibly being applied to the entire method steps of comparing and/or selecting, to a ROI relevant for the component being tested, only partial projections may need to be evaluated, e.g. such that a speed gain can be obtained.

The position and orientation of the item in three-dimensional space may be determined by taking the at least one geometric parameter and the one or more parameters of the two-dimensional transformation into account. For example, the at least one geometric parameter may comprise complementary 3D information of the position and/or orientation of the item that cannot be obtained directly from the 2D transformation. However, when considered in combination, it is possible to derive a full characterization of tie 3D position and orientation of the item.

It shall also be clear that a plurality of items may be imaged simultaneously in the projection image, and a method in accordance with embodiments of the present invention may be applied to each of these items to determine a relative orientation and/or position of each of the objects separately. For example, a segmentation algorithm may be applied to the projection image to detect the separate items, and each item may be considered separately to derive a full characterization of the 3D position and orientation of each item. Furthermore, constraints on relative position and/or orientation of these items with respect to each other can be taken into account, e.g. by constraining one or more angles of rotation of the items to be identical and/or to constrain a relative distance between the items to a known distance.

As already indicated hereinabove, the transformed simulation image may be used iteratively to refine the selection of the simulated projection image from the plurality of simulated projection images, repeating the steps of selecting the simulated projection image (and its associated at least one geometric parameter), determining the 2D transformation and transforming the projection image, e.g. until convergence is achieved or assumed.

Furthermore, the library of precomputed simulated projection images, or a procedure of near real-time simulation, may be used in a rough estimation step, e.g. for determining a first angle, and a fine estimation step, e.g. for determining a set of three complementary Euler angles, e.g. per item in view.

The method comprises determining 5 at least one angle of rotation taking a viewing angle and the relative orientation into account. For example, using the determined relative orientation and/or position of the item with respect to the imaging system, a suitable rotation and/or translation of the item and/or the imaging system can be determined, e.g. using elementary linear algebra operations, to achieve a relative position and/or orientation of the item with respect to the imaging system that corresponds to the viewing angle.

The viewing angle (and/or further viewing angles) may be predetermined, e.g. defined by a user to indicate viewing angles in which the item needs to be inspected. However, the method may also comprise determining 10 the viewing angle and/or one or more further viewing angles corresponding to, or clustered around, one or more angles of good visibility of said item.

These viewing angles, or visibility angles, may represent the orientations of the object where a component is most visible or where a defect is most detectable. A combination of a plurality of visibility angles may also, collectively, correspond to an optimal (or sufficiently near-optimal) combination for detecting a defect or characteristic of interest of the item. Furthermore, a plurality of items may be imaged simultaneously, e.g. as components of a larger object being imaged or by imaging the plurality of items when placed simultaneously in the field of view of the imaging system. Thus, the plurality of visibility angles may correspond to different visibility angles or sets of visibility angles for detecting a defect or characteristic of each of the items respectively.

In other words, based on the characteristics of the item that need to be verified, a number of optimal viewing orientations can be determined, e.g. can be specified by a user, can be automatically calculated, or a combination of both. For example, the method may comprise calculating one or more viewing angles by optimization of viewpoint entropy, a contrast measure, or another quality measure in a region of interest (ROI), e.g. where a component or possible defect to be evaluated is located in the item, over the at least one geometric parameter. The at least one geometric parameter obtained by such optimization can be used, in a straightforward manner, to calculate the viewing angle. This process can be repeated for obtaining multiple local maxima of the quality measure and/or for different region of interest to formulate a plurality of viewing angles. Embodiments of the present invention are not limited to such approach. For example, a deep learning, machine learning or artificial intelligence method may be applied to determine a set of view angles which collectively allow a good characterization of the item and/or detection of defects in the item.

The method comprises moving 6 the item and/or the imaging system in accordance with the at least one angle of rotation and acquiring 7 a further projection image of the item, after moving 6 the item, such that the further projection image corresponds to a view of the item from the viewing angle.

Furthermore, determining 5 the at least one angle of rotation may also comprise determining at least one translation step, and moving 6 the item and/or the imaging system may also comprise moving the item and/or the imaging system in accordance with the at least one angle of rotation and the at least one translation step. The moving may comprise a translation, e.g. using a translation table supporting the item. The moving may comprise a rotation, e.g. using a turntable supporting the item. The moving may comprise rotating the imaging system around the item over a first angle, e.g. using a rotating gantry, or over multiple complementary angles, e.g. using a robotic arm having two or three degrees of rotational freedom.

In a method in accordance with embodiments of the present invention, the steps of determining 4 the relative orientation, determining 5 the at least one angle of rotation, moving 6 the item and acquiring 7 a further projection image may be repeated 8 for one or more further viewing angles. The acquired 7 further projection image is then used as the projection image on which to operate in the following repetition loop, e.g. to determine the relative orientation and the at least one angle of rotation.

Figure 2:
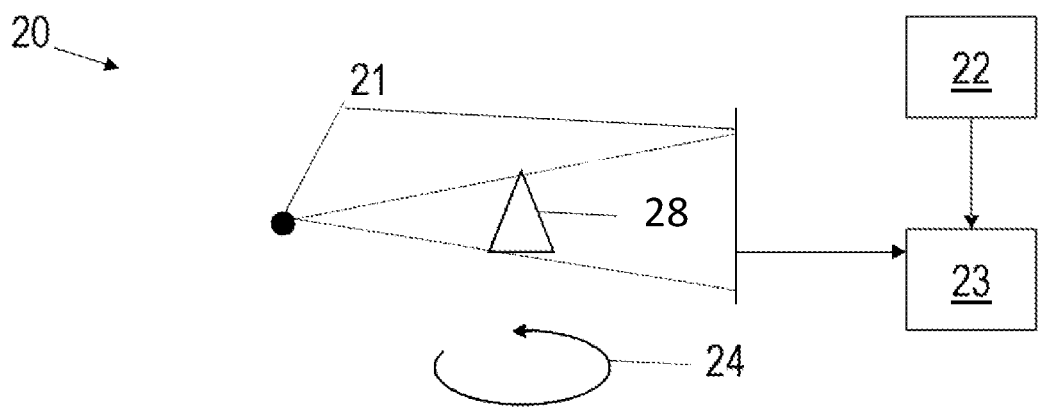
FIG. 2 shows a system in accordance with embodiments of the present invention.

Referring to FIG. 2, in a second aspect, the present invention relates to a system 20 for inspection of an item. The system comprises a radiation imaging system 21, e.g. comprising a radiation source and a radiation imaging detector, such as an ionizing radiation source and ionizing radiation imaging detector, for acquiring a projection image of the item 28. The system comprises a simulator 22 or a precomputed library 22, for providing a plurality of simulated projection images of the item based on a simulation of a numerical three-dimensional model of the item, in which at least one geometric parameter, e.g. one or more rotation angles, relating to the relative orientation between the simulated item, a simulated radiation source and a simulated detection plane varies over the plurality of simulated projection images.

The system comprises a processor 23, e.g. a computer, central processing unit, field programmable gate array or application specific integrated circuit. The processor 23 is adapted for determining a relative orientation of the item with respect to the radiation imaging system, in which determining the relative orientation comprises comparing the projection image to the plurality of simulated projection images.

The processor 23 may be adapted for determining a two-dimensional transformation between the projection image and a simulated projection image selected from the plurality of simulated projection images, in which this transformation is determined by numerically optimizing an image similarity measure between the projection image and the simulated projection image, wherein one or more parameters of the two-dimensional transformation are indicative of a translation and/or rotation of the item in the projection image plane.

The processor may be adapted for transforming the projection image by the two-dimensional transformation to obtain a transformed projection image in which the item is substantially positioned and oriented as in the selected simulated projection image. The processor may be adapted for determining a position and orientation of the item in three-dimensional space taking the one or more parameters of the two-dimensional transformation into account.

The processor may be adapted for optimizing an image similarity measure between the transformed projection image and the plurality of simulated projection images, as function of the at least one geometric parameter, to determine the at least one geometric parameter, and for determining the position and orientation of the item in three-dimensional space by taking the at least one geometric parameter and the one or more parameters of said two-dimensional transformation into account.

The processor is adapted for determining at least one angle of rotation taking a viewing angle, e.g. a predetermined viewing angle, and the determined relative orientation into account.

The system comprises an actuator 24, controlled by said processor 23, for moving the item and/or the imaging system in accordance with the determined at least one angle of rotation such as to position and/or orient the item and/or the imaging system with respect to each other to acquire a further projection image of the item corresponding to a view of the item from the viewing angle.

The processor may be adapted for repeatedly determining the relative orientation, determining the at least one angle of rotation, moving the item and acquiring a further projection image for one or more further viewing angles, in which the last acquired further projection image is used as the projection image on which to operate in the following repetition loop.

In a further aspect, the present invention relates to a use of a method or system in accordance with embodiments of the present invention for quality control, testing, classification, selection, metrology, and/or sorting of each item of a plurality of items in a manufacturing or handling environment for manufacturing or manipulating the plurality of items.

In a yet further aspect, the present invention relates to a computer program product for implementing, when executed on a processor, a method in accordance with embodiments of the present invention, e.g. by interfacing with the radiation imaging system and the actuator.

Other features, or details of the features described hereinabove, of a device, use and/or computer program product in accordance with embodiments of the present invention shall be clear in view of the description provided hereinabove relating to a method in accordance with embodiments of the present invention.

Hereinbelow, examples for illustrating aspects of embodiments of the present invention are presented. These examples are provided for aiding the skilled person in understanding the present invention and in reducing the invention to practice, but should not be construed as limiting the invention to specific features of the examples as presented.

Without loss of generality, in the present examples, a typical turntable-based micro-CT (μCT) setup is used. An item is placed on a turntable stage of a μCT system, positioned between a stationary X-ray source and detector. It shall be understood by the skilled person that such setup can be considered as substantially equivalent to a system in which the item is positioned at a fixed position while a position of an X-ray source and/or an X-ray detector can be varied, e.g. rotated around the item. It shall also be understood that, in such equivalent system, the item can be stationary, only transiently stationary at the position, or even non-stationary. For example, the item may move along a path, e.g. in a conveyor system, while being imaged from a plurality of projection angles. The item may remain momentarily stationary while acquiring such different projection views, or may move continuously along the path with a known velocity, such that different positions of the object can be compensated for when analyzing the acquired projection views. It shall also be understood that embodiments of the present invention are not limited to a μCT system, e.g. the system is only used for acquiring a small number of projections which would typically be insufficient to perform a tomographic reconstruction. It shall be understood that embodiments of the present invention are not limited to the use of ionizing radiation, but may also use other types of projection imaging, such as, without limitation, terahertz imaging, gamma radiation imaging, optical imaging of transparent or translucent objects, infrared imaging.

Figure 3:
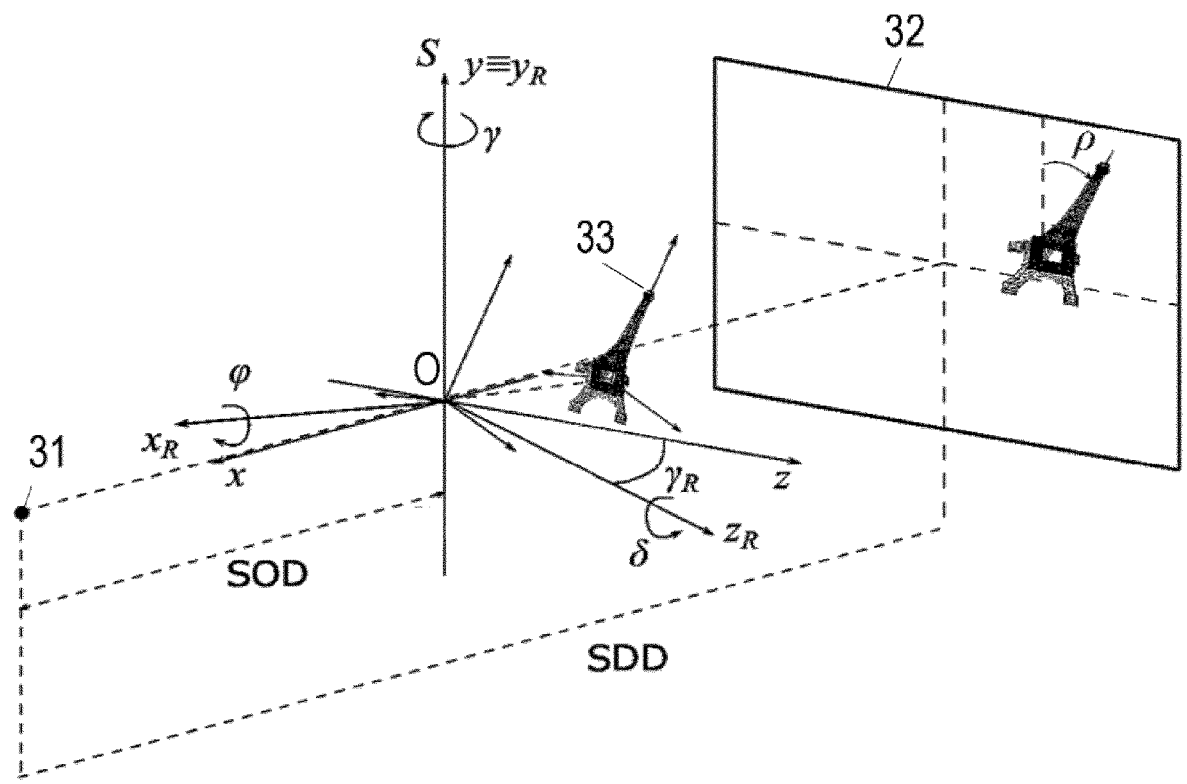
FIG. 3 shows a system geometry in an example illustrating embodiments of the present invention.

Returning to the μCT system of the present examples, a world coordinate system S is assumed that is defined in relation to a first radiograph, centered in the center of the rotary stage O. The world coordinate system S is defined by the unitary basis vector x=(1, 0, 0) oriented in the detector-source direction and the unitary basis vectors y and z such that the basis (x, y, z) forms an orthonormal basis of the coordinate system S. The basis vectors y and z are thus oriented parallel to the detector plane. The position and orientation of the sample item are defined by the translation tx, ty and tz with respect to the origin O of S, and rotations around the principal axes $\delta$, γ and φ. FIG. 3 illustrates the system geometry of the present examples. The X-ray source 31 is located at a source-item distance SOD from the center of the stage. The X-ray detector 32 is located at a source-detector distance SDD from the source 31. When the item 33 is placed on the stage, an a-priori unknown deviation in the rotation angles may occur, as well as an a-priori unknown translation with respect to the world coordinate system. Particularly, the rotation angle γ of the sample is assumed to be unknown. For example, in a typical application, the rotation angles γ and δ may be rotations around axes that are parallel to the imaging plane, while the rotation angle φ represents a rotation around an axis perpendicular to the imaging plane. Therefore, the angle φ may be determined directly by optimizing a 2D transformation of the image. Furthermore, assuming a stable contact surface of the item where it contacts the turntable, deviations of the angle δ may be small and constrained by natural relaxation of the position of the item to its stable equilibrium. Therefore, the angle γ of the sample may be the most important parameter to account for, since it can be subject to relatively large variation and represents 3D information that cannot be directly derived from a single projection image without using information from different views, e.g. using a library of simulated views over a large range of the angle γ.

Figure 4:
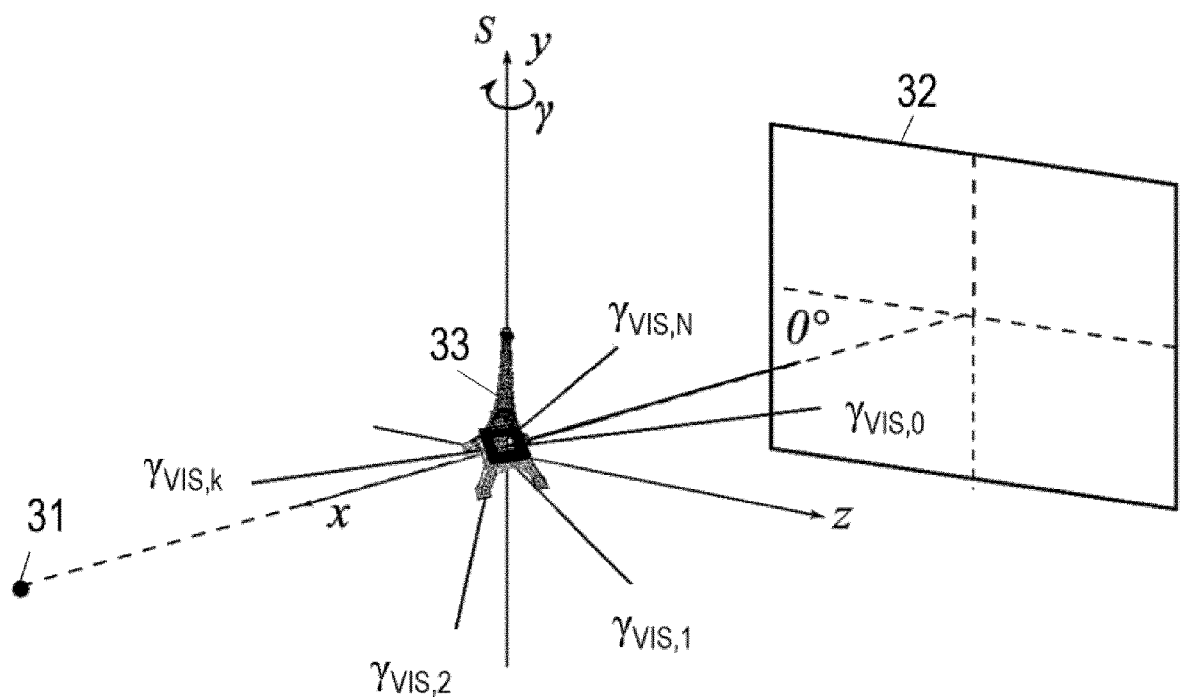
FIG. 4 shows target viewing angles for imaging an item in an example illustrating embodiments of the present invention.

A set of viewing angles, further referred to as visibility angles, can be predetermined based on prior knowledge of the CAD model and the material properties of the sample item itself. These visibility angles represent the orientations of the item where a component is most visible or where a defect is most detectable. In other words, based on the characteristics of the item that need to be verified, a number of optimal viewing orientations can be determined, e.g. can be specified by a user, can be automatically calculated, or a combination of both. For example, the set of visibility angles may be calculated from simulated projections at different angular views using quantitative measures such as the viewpoint entropy or certain criteria in a region of interest (ROI), e.g. based on a contrast measure. The visibility angles, e.g. as illustrated in FIG. 4, can be selected as the $\gamma_{VIS,0}, \ldots, \gamma_{VIS,N}$ views where such quantitative measure has its highest values.

During the image acquisition procedure in accordance with embodiments of the present invention, a fast alignment may be performed between the measured data, i.e. the acquired projection image(s) and the simulated images, resulting in a 3D alignment between the numerical model, e.g. the CAD model, and the item. A fast projection simulator may be used to project the numerical model, e.g. the CAD model, to simulate projections for different orientations and translations of the item, e.g. projections can be simulated while rotating and shifting the CAD model. By finding the orientation and translation parameters for the simulated projection that provide the best match to the acquired projection image, a 3D alignment can be achieved using just one projection. Such projection simulator, also referred to as the CAD projector, may be efficiently implemented to achieve near or sufficiently near real-time simulated projections, e.g. may be implemented on a (general purpose) graphics processing unit (GPU). However, when it is not feasible to create synthetic projections in real time or at least sufficiently fast, an approach in which data is precalculated can be used. In the present example, the procedure is split into two main parts: the first part describes the data that can be precalculated, while the second part describes the methodology to dynamically acquire the visibility angles by calculating the necessary rotation angle of the rotary stage, starting from an unknown item orientation.

In what follows, it is assumes that system parameters have been calibrated and that the source spectrum has been estimated, such that the CAD projector can perform a realistic simulation of a projection image of the CAD model using a polychromatic radiation transport simulation. An example of a suitable CAD projector and procedure for configuration of such CAD projector based on the determined system parameters and spectrum can be found in Marinovszki et al., "An efficient cad projector for x-ray projection based 3D inspection with the ASTRA toolbox", in 8th Conference on Industrial Computed Tomography (2018).

Figure 5:
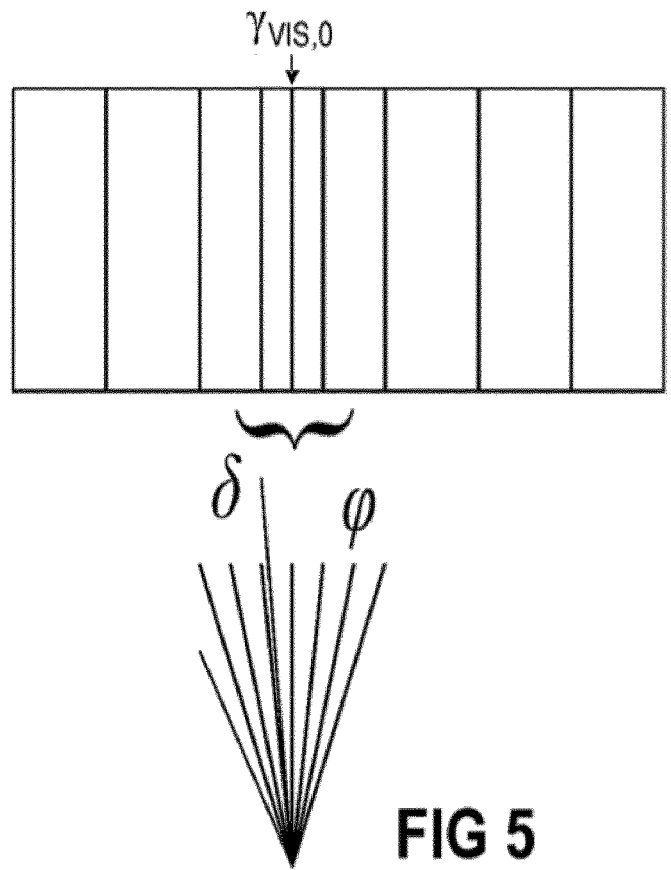
FIG. 5 shows an expanded library containing additional angle parameters in a neighborhood of a target viewing angle in an example illustrating embodiments of the present invention.

In the first part of the procedure referred to hereinabove, a library of simulated projection data can be precomputed for discretized projection angles and/or translation steps, for example for equispaced angular steps, e.g. of at least the angle γ. The projection data in the library are created by a simulation that takes into account the calibrated system parameters and the estimated spectrum, while varying the angle γ (with the item projected in the middle of the detector). To reduce the memory requirements of the library, only a region of interest (ROI) of the simulated projections may be stored and used. For example, the ROI may be defined such that is large enough for the alignment algorithm to function properly. The size of the ROI may be calculated based on a quality measure, e.g. sufficient variation of an image property, such as contrast and/or entropy, over the range of the discretized angle steps, or may be determined by a trial and error routine. The library can be expanded in the neighborhood of the visibility angles, to account for the approximation introduced by ignoring deviations of φ and δ, as shown in FIG. 5. Such expansion allows to take into account possible deviations in φ and δ of the item sample at the visibility angles, since the rotary stage, in this example, cannot compensate for such deviations. However, in a fully 3D system where the sample and/or the source and detector are controlled by a robotic arm, the optimal viewing angles can be acquired in 3D.

Figure 6:
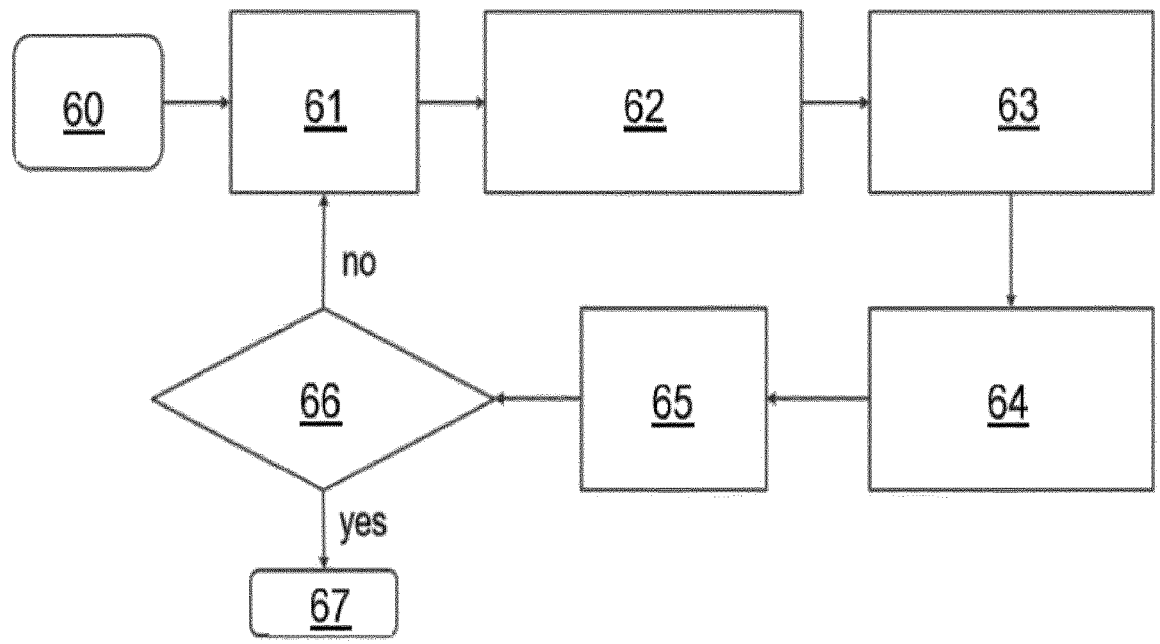
FIG. 6 shows a flowchart of an exemplary method in accordance with embodiments of the present invention.
Figure 7:
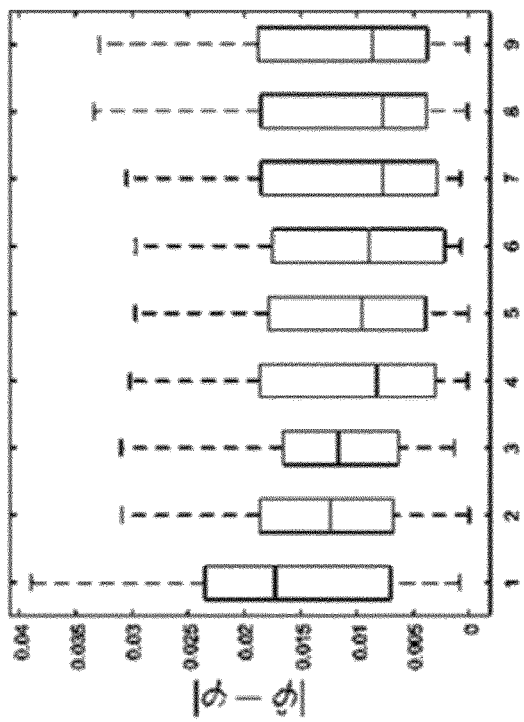
FIG. 7 shows the absolute difference error of an angular estimation of an angle delta, in an example illustrating embodiments of the present invention, in which orientation and position parameters are randomly sampled and the angle gamma is presumed to be known.
Figure 8:
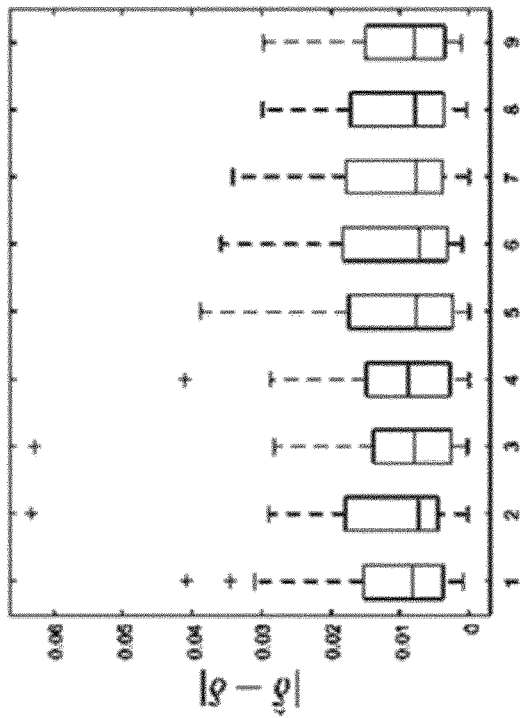
FIG. 8 shows the absolute difference error of an angular estimation of an angle phi, in an example illustrating embodiments of the present invention, in which orientation and position parameters are randomly sampled and the angle gamma is presumed to be known.
Figure 11:
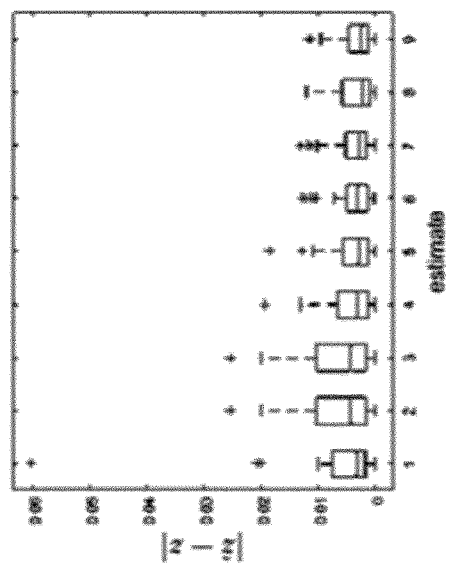
FIG. 11 shows the absolute difference error of an estimation of a position component z, in an example illustrating embodiments of the present invention, in which orientation and position parameters are randomly sampled and the angle gamma is presumed to be known.
Figure 10:
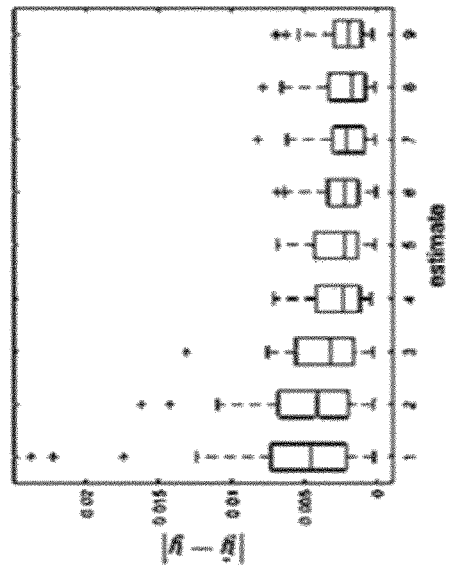
FIG. 10 shows the absolute difference error of an estimation of a position component y, in an example illustrating embodiments of the present invention, in which orientation and position parameters are randomly sampled and the angle gamma is presumed to be known.
Figure 9:
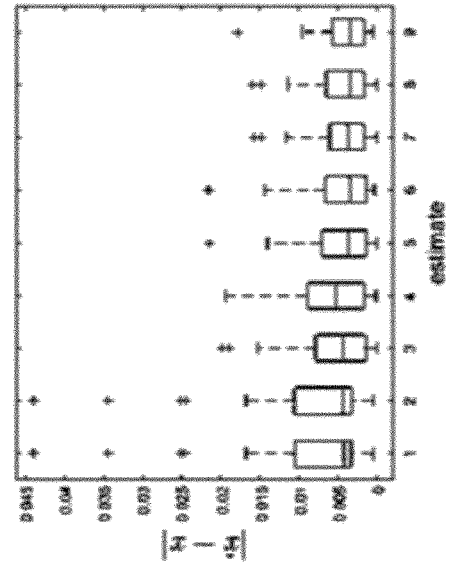
FIG. 9 shows the absolute difference error of an estimation of a position component x, in an example illustrating embodiments of the present invention, in which orientation and position parameters are randomly sampled and the angle gamma is presumed to be known.
Figure 12:
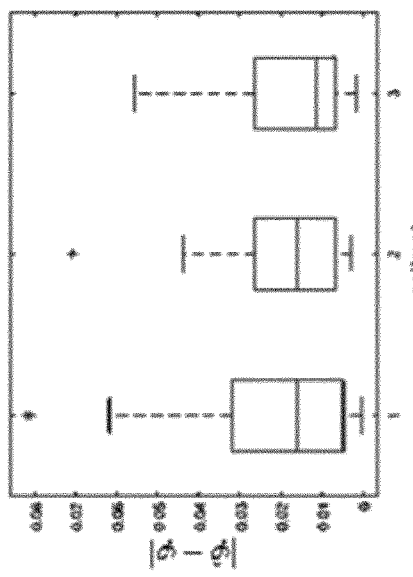
FIG. 12 shows the absolute difference error of an angular estimation of an angle gamma, in an example illustrating embodiments of the present invention, in which orientation and position are randomly sampled.
Figure 13:
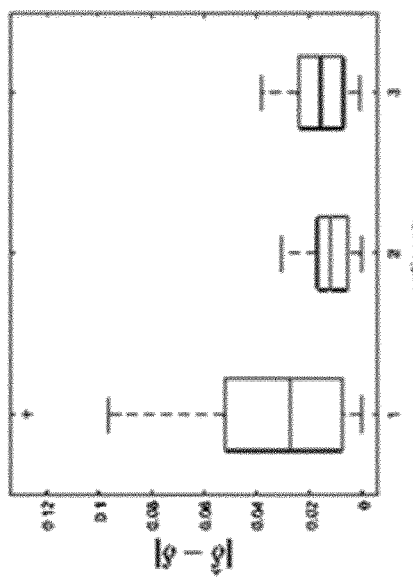
FIG. 13 shows the absolute difference error of an angular estimation of an angle delta, in an example illustrating embodiments of the present invention, in which orientation and position are randomly sampled.
Figure 14:
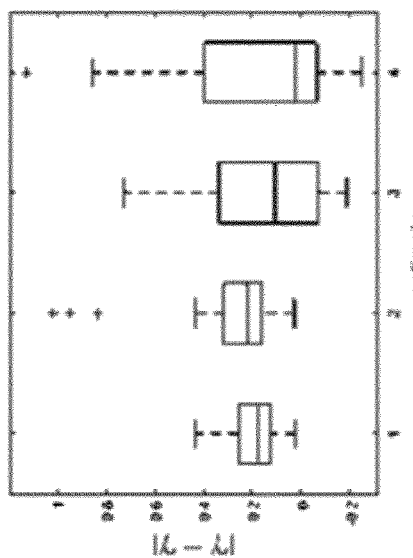
FIG. 14 shows the absolute difference error of an angular estimation of an angle phi, in an example illustrating embodiments of the present invention, in which orientation and position are randomly sampled.
Figure 15:
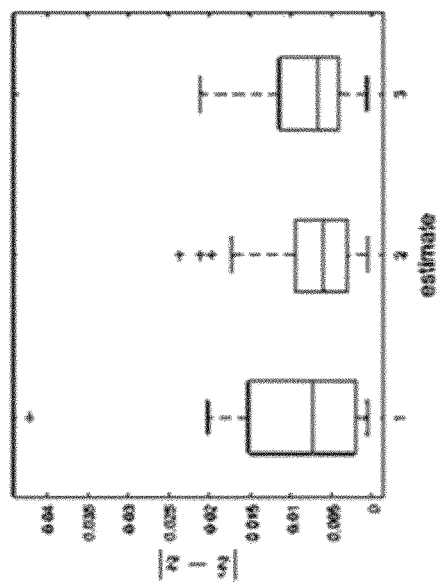
FIG. 15 shows the absolute difference error of an estimation of a position component x, in an example illustrating embodiments of the present invention, in which orientation and position are randomly sampled.
Figure 16:
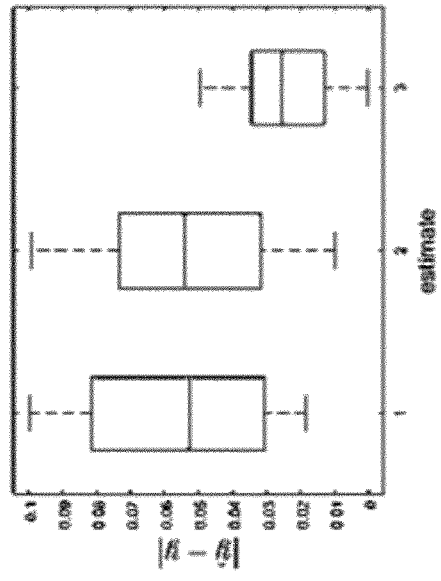
FIG. 16 shows the absolute difference error of an estimation of a position component y, in an example illustrating embodiments of the present invention, in which orientation and position are randomly sampled.
Figure 17:
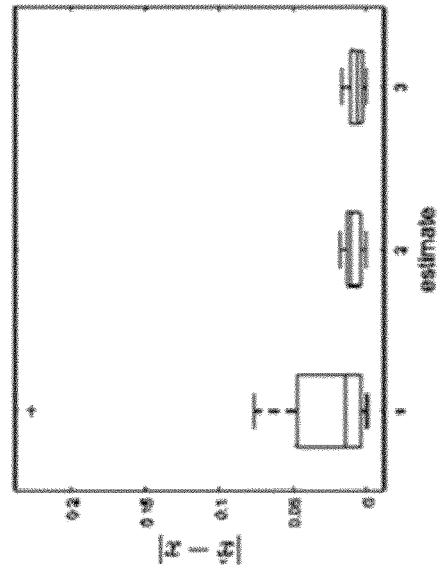
FIG. 17 shows the absolute difference error of an estimation of a position component z, in an example illustrating embodiments of the present invention, in which orientation and position are randomly sampled.

To steer the acquisition system, i.e. the radiation imaging system, to acquire the radiographs at or sufficiently near the visibility angles, the position and orientation of the item in the stage is estimated. The dynamic angle selection method described hereinbelow is schematically shown in FIG. 6. $S_0$, $D_0$, $u_0=(0, 0, 1)$ and $v_0=(0, 1, 0)$ respectively refer to initialization values of the source position, the center point of the detector, and the vectors defining the detector plane, with respect to the coordinate system S. $\gamma_0^{rot}=0$ arc degree is the initial projection angle. The exemplary procedure comprises an iteration over N steps, e.g. for each of the visibility angles, in which k refers to the iteration counter k=1 . . . N. Entry point 60 indicates the entry point of the procedure for iteration k=1.

In each iteration step, a projection image is acquired 61, e.g. in the present example using the μCT scanning system. In the first iteration, the item is positioned and oriented in an a-priori unknown position and orientation. In each iteration, the orientation of the item is manipulated before the next projection image acquisition, such that the item is oriented for imaging in the direction of respectively each of the visibility angles.

After the image acquisition, a rigid transformation is determined 62 to estimate a translation and a rotation in 2D. To recover the 2D pose of the projected item, a similarity transformation is applied to the measured projection: it is rotated, translated, and scaled to be aligned with the simulated projection for a default position of the numerical model, e.g. the CAD model. For example, for the first iteration, a default simulated projection is selected which corresponds to a best guess, e.g. a statistical measure of centrality, of the orientation of the item. In the next iterations, the default simulated projections may correspond respectively to each of the viewing angles. The transformation, using mutual information as a quantitative measure of similarity, contains the information about the translations $t_{y,det}$ and $t_{z,det}$ and the rotation pin the detector plane. For example, the mutual information, or a similar measure, between the transformed projection image and the simulated projection image can be maximized in an optimization procedure as function of the transformation parameters, which explicitly or implicitly comprise the translations $t_{y,det}$ and $t_{y,det}$ and the rotation ρ in the detector plane.

Then a 3D estimation of the orientation angles $\hat{\gamma}_k$, $\hat{\delta}_k$ and $\hat{\phi}_k$, and the translation estimates $\hat{t}_x$, $\hat{t}_y$ and $\hat{t}_z$ can be performed 63.

In the first iteration k=1, the sample item rotation $\hat{\gamma}_k$ around the vertical axis is estimated by a lookup through the library on the basis of the structure similarity index measure (SSIM). Thus, the sample rotation, indexed in the library, is found for which the SSIM between the transformed projection image and the library image reaches a maximum.

For the next iterations, the item sample rotation $\hat{\gamma}_k$ has already been updated in the last step of the previous iteration loop to $\gamma_{VIS,k}$.

Then, $S_k$, $D_k$, $u_k$ and $v_k$ are calculated by rotating $S_0$, $D_0$, $u_0$ and $v_0$ over $\gamma_k^{rot}$. The orientation of the item in the detector plane is represented by $j_{k,det}=D_k+\cos(\rho_k\ u_k)+\sin(\rho_k\ v_k)$. The translation in the detector plane is defined by $D_{k,det}=D_k+t_{z,det}\ u_k+t_{y,det}\ v_k$.

For next iterations k>1, the 3D point of intersection $P_{int}$ between the lines $S_1+\lambda_1(j_{1,det}-S_1)$, . . . , $S_k+\lambda_k(j_{k,det}-S_k)$ is determined, i.e. the intersection of the set of lines connecting, respectively for each iteration, the 3D source position $S_k$ and the 3D point $j_{k,det}$ representative of the orientation of the item in the detector plane. $S_1$, . . . , $S_k$ and $j_{1,det}$, . . . , $j_{k,det}$ are calculated. This intersection can be approximated by a minimization of a residual error, e.g. a least-squares fit, e.g. to compensate for measurement errors.

The orientation of the item is defined by the unitary vector $j'=P_{int}/\|P_{int}\|$. This vector is obtained by applying the rotations to j':

$$j' = R_x(\phi)R_z(\delta)R_y(\gamma)j = \begin{pmatrix} -\sin\delta \\ \cos\phi\cos\delta \\ \sin\phi\sin\delta \end{pmatrix}$$

This equation does not depend on γ, since a single vector does not contain the complete information about orientation. Therefore, the value of δ and φ can only be estimated if considering no γ rotation. For this reason, before applying the latter equation to recover $\hat{\delta}_k$ and $\hat{\phi}_k$, the vector j' is rotated over $-\hat{\gamma}_k$.

Then $O_{int}$ is calculated, the point of intersection between the lines connecting $S_1$, . . . , $S_k$ and $D_1$, . . . , $D_k$, e.g. analogous to determining the intersection (or best approximation thereof) of the lines connecting $S_1$, . . . , $S_k$ and $j_1$, . . . , $j_k$ discussed hereinabove. Its coordinates are the translation estimates of $\hat{t}_x$, $\hat{t}_y$ and $\hat{t}_z$.

Then, the estimates of $\hat{\gamma}_k$, $\hat{\delta}_k$ and $\hat{\phi}$ can be refined by a lookup in the extended library in the neighborhood of the current values, e.g. using again an optimization using a similarity metric such as the SSIM.

If k<N (see condition 66: k=N), the iteration counter is increased 65, k=k+1, and the system, e.g. the turntable, is rotated 64 around $\gamma_{k,rot}=\gamma_{VIS,k}-\gamma_{k-1}$. $\hat{\gamma}_k$ is set to $\gamma_{VIS,k}$ and the next iteration loop is performed.

Otherwise (k=N), the procedure ends 67.

To check the precision of this methodology, 30 experiments were performed while randomly choosing δ, φ∈[−3, 3] arc degree, γ∈[0, 360] arc degree, and $t_x$, $t_y$, $t_z$∈[−3, 3] mm. At this point, the γ parameter was supposed to be known, while the other parameters were estimated. Results are shown in FIG. 7 to FIG. 11. Also, 19 experiments were performed while randomly choosing δ, φ∈[−3, 3] arc degree, γ∈[0, 89.9] arc degree, and $t_x$, $t_y$, $t_z$∈[−3, 3] mm. At this point, all parameters were estimated, in which the γ parameter was determined by a lookup in the library. Results are shown in FIG. 12 to FIG. 17.

EXAMPLE

In this example, a robust and efficient forward projector was used to simulate the projection images for an industrial CAD model, e.g. a shape model enhanced with radiation properties of the materials involved, in a limited amount of time, e.g. such as to be able to be used in a process for inline inspection. The projector was implemented in software, making use of a common GPU-based processing platform. The NVIDIA Optix library was used for this exemplary implementation. It is an advantage of the used implementation that robustness to small variations in the geometry can achieved, using techniques known in the art. X-ray radiographs were accurately simulated, taking the X-ray spectrum, the attenuation coefficients of the model component materials and efficient first order approximations of the physics models into account. Polychromatic X-rays are virtually cast from a source, penetrate the CAD model and hit a virtual detector. After detecting the points of collision of the X-ray beam with a triangle mesh, the line length that a ray travels inside the model is calculated. In order to compare the simulated projection images to the acquired projection images, the geometrical and spectral parameters of the radiation imaging system, such as the position of the source, the detector, the rotation axis with respect to the reference system centered in the center of mass of the item, and the detector and pixel dimensions are determined.

To adequately simulate the behavior of the beam when intersecting the item sample, the materials of all the components are predefined. A spectrum estimation as described in Marinovszki et al, "An efficient CAD projector for X-ray projection based 3D inspection with the ASTRA Toolbox," 8th Conference on Industrial Computed Tomography, Wels, Austria was used. This estimation was performed by minimizing the discrepancy between the intensity values of the measured and simulated data. This approach has been extended to allow geometric calibration using CAD data of a calibration phantom in terms of position and orientation of the rotation axis, the detector, the phantom and the position of the source. These parameters are optimized using a Hill climbing algorithm.

To avoid long execution times during an inline alignment procedure to achieve accurate results, three different libraries were used, all of them providing precalculated simulated projection images. The first one contains only a window of simulated images that will be used during inspection for an initial fast alignment, the second one contains (only) data in a specific region of interest where quality control need to be performed, for a higher detail alignment, and the last one contains only the component subject of inspection, i.e. for a final fine-grained alignment and or use in computing difference images and/or similarity measures between the acquired radiographs and the simulated radiographs. The ROI can be optimized in order to best discriminate between defective and non-defective samples.

During the inline inspection, after the original projections have been aligned to the window, the so-called visibility angles, i.e. the projection angles where the part to inspect is most visible, are identified. A criterion is used that finds the maximum contrast of the component compared to its surrounding background. In order to exclude the possibility of choosing visibility angles where the part is hidden by other components, the approach weights the contrast calculated when only projecting this part with the overall contrast of a full projection. The values of the weighted contrast for each projection angle can be precalculated and stored in a matrix: in the inspection phase, the visibility angles are chosen as the maximum values among those corresponding to the projection angles selected during the alignment step. Finally, the peak signal-to-noise ratio and the mean squared error are used as measures to quantify differences between the images and discriminant analysis is performed.

Figure 18:
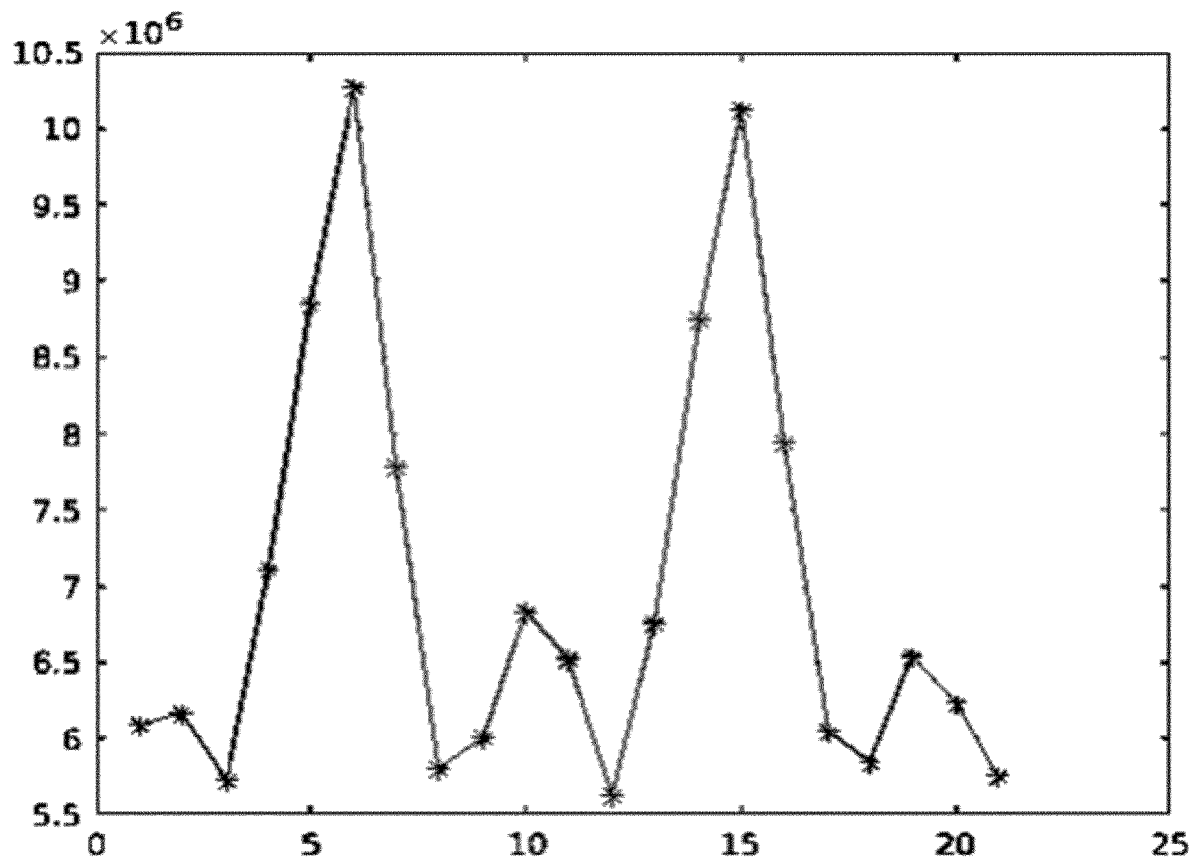
FIG. 18 shows, in an example relating to embodiments of the present invention, a plot of the variation of the weighted contrast as function of the projection angle for simulated data, calculated in a ROI containing a component for inspection.
Figure 20:
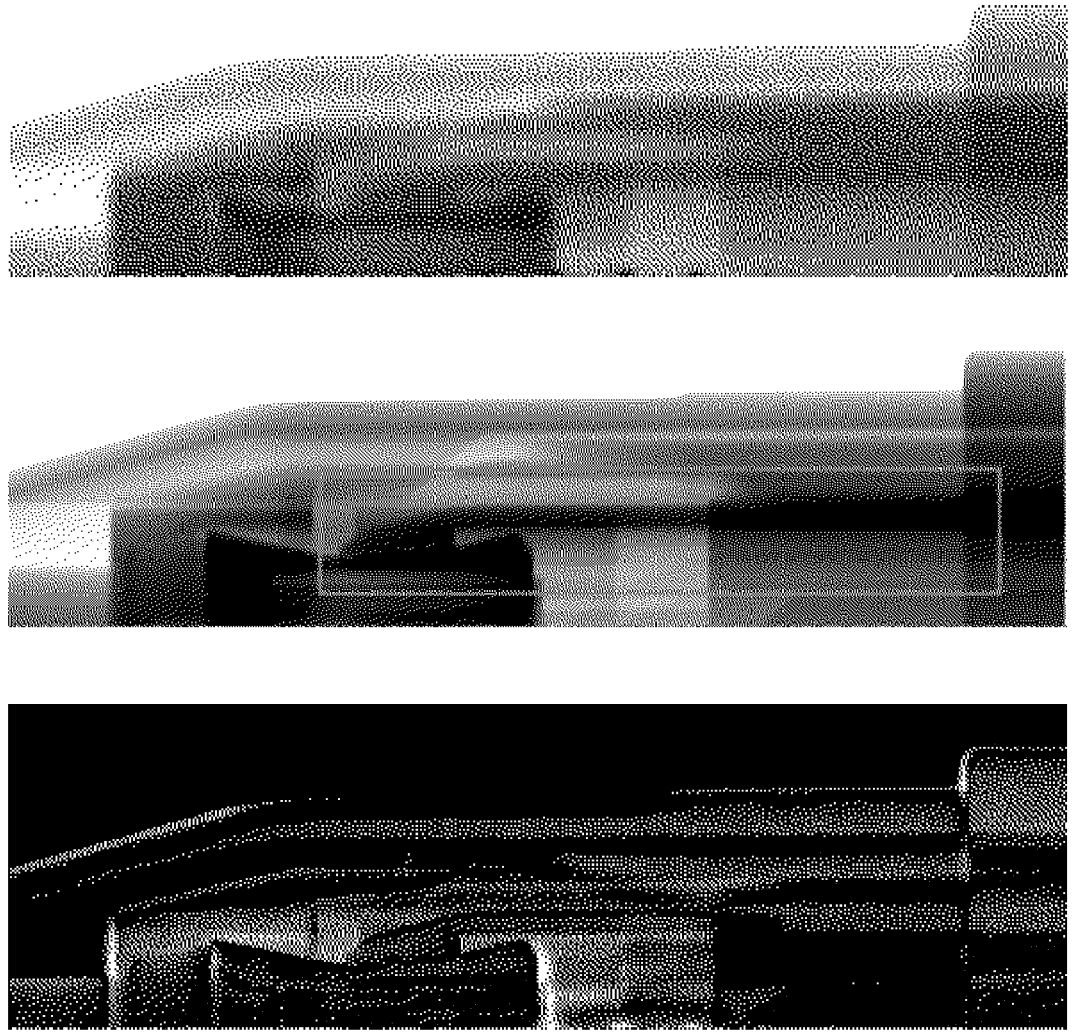
FIG. 20 shows the result of a window alignment process, in an example relating to embodiments of the present invention.

FIG. 18, also discussed hereinabove, shows a plot of the variation of the weighted contrast in function of the projection angle for simulated data, in a ROI containing an inspected component, clearly shows peaks when the component is most visible. This approach was validated with measured inline scans of medical devices. For each inline scan, a number of 21 projection angles were acquired. The result of the window alignment process is shown in FIG. 20, and the component under inspection is indicated by a rectangle. A cutting of a measured projection, i.e. an acquired projection image, is shown in the top image, the simulated projection radiograph window is shown in the center row and a difference image after alignment is shown in the bottom image.

Figure 19:
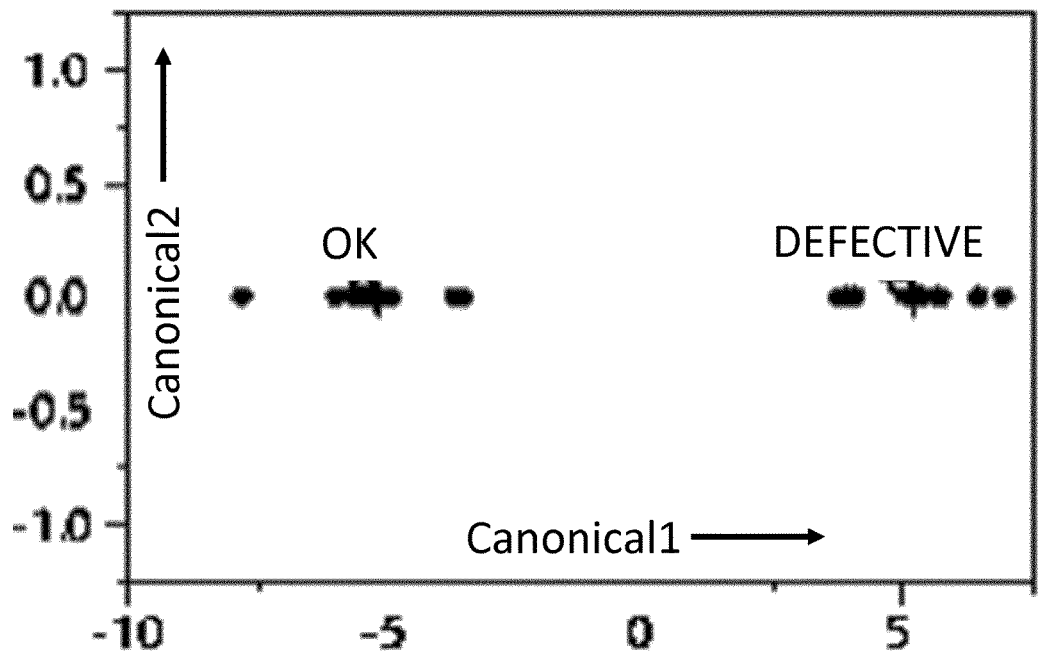
FIG. 19 shows a canonical plot of linear discriminant analysis performed on a group of 30 samples, in an example relating to embodiments of the present invention.

In FIG. 19, a canonical plot of linear discriminant analysis (LDA) performed on a group of 30 samples is shown, in which the mean squared error (MSE) and the signal to noise ratio (SNR) are used to classify the samples into non-defective and defective cases. The LDA shows the performance of the proposed methodology to separate non-defective samples (labelled 'ok') from defective samples (p=0.027).

The invention claimed is:

1. A non-destructive method (1) for inspection of an item, the method comprising:
   acquiring (2) a projection image of the item using a radiation imaging system;
   obtaining (3) a plurality of simulated projection images of the item or at least one component thereof, based on a simulation of a numerical three-dimensional model of the item or the at least one item component, in which at least one geometric parameter relating to the relative orientation between the simulated item, a simulated radiation source, and a simulated detection plane varies over the plurality of simulated projection images;
   determining (4) a relative orientation of the item with respect to the radiation imaging system, said determining of the relative orientation comprising comparing (9) the acquired projection image to the plurality of simulated projection images, and selecting at least one simulated projection image with the highest image similarity measure to the projection image;
   determining (5) at least one angle of rotation taking a viewing angle and the relative orientation with respect to the selected simulated projection image into account;
   moving (6) the item and/or the radiation imaging system in accordance with the at least one angle of rotation;
   acquiring (7) a further projection image of the item, after moving the item and/or the radiation imaging system, such that the further projection image corresponds to a view of the item from the viewing angle.

2. The method of claim 1, wherein determining (4) the relative orientation, determining (5) the at least one angle of rotation, moving (6) the item, and acquiring (7) a further projection image are repeated (8) in loops for one or more further viewing angles, comprising 2 to 20 further viewing angles, in which a last acquired (7) further projection, or a combination of further projections acquired thus far, is used as the projection on the basis of which determining (4) a relative orientation of the item with respect to the radiation imaging system is carried out in the following loop.

3. The method of claim 1, wherein obtaining (3) said plurality of simulated projection images comprises obtaining a library of the plurality of simulated projection images, wherein said plurality of simulated projection images is precomputed based on a three-dimensional numerical model.

4. The method of claim 1, wherein obtaining said plurality of simulated projection images comprises obtaining a three-dimensional numerical model of said item or the at least one component thereof, and simulating said plurality of projection images based on said numerical model of said item or the at least one component thereof for a plurality of values of the at least one geometric parameter, wherein simulating said plurality of simulated projection images comprises virtually casting polychromatic rays of ionizing radiation from a radiation source through the numerical model onto a simulated image detector, wherein said radiation imaging system corresponds to geometric and spectral parameters used for virtually casting said polychromatic rays.

5. The method of claim 1, further comprising determining (10) one or more further viewing angles corresponding to, or clustered around, one or more angles of visibility of said item, wherein said determining (10) of the one or more further viewing angles comprises calculating the one or more further viewing angles by optimization of a quality measure in a two-dimensional region of interest in the plurality of simulated projection images over the at least one geometric parameter and/or a quality measure in a three-dimensional region of interest in the numerical model projected onto a corresponding two-dimensional region in the plurality of simulated projection images over the at least one geometric parameter.

6. The method of claim 1, wherein determining (4) the relative orientation of the item with respect to the radiation imaging system comprises determining a two-dimensional transformation between the projection image and a simulated projection image selected from the plurality of simulated projection images, said transformation being determined by numerically optimizing an image similarity measure between the projection image and the simulated projection image or by applying the projection image as input to a machine learning algorithm trained on the plurality of simulated projection images, wherein one or more parameters of said two-dimensional transformation are indicative of a translation and/or rotation of the item in the projection image plane.

7. The method of claim 6, wherein determining (4) the relative orientation of the item comprises transforming the projection image by the two-dimensional transformation to obtain a transformed projection image in which the item is positioned and oriented as in the selected simulated projection image.

8. The method according to claim 7, wherein determining (4) the relative orientation of the item comprises determining a position and orientation of the item in three-dimensional space taking the one or more parameters of the two-dimensional transformation into account, and wherein an image similarity measure between the transformed projection image and the plurality of simulated projection images is optimized, as function of the at least one geometric parameter, to determine the at least one geometric parameter, or wherein the at least one geometric parameter is determined by prediction of said machine learning algorithm when presented with the projection image as input, the machine learning algorithm being trained on the plurality of simulated projection images and associated geometric parameters.

9. The method of claim 8, wherein the position and orientation of the item in three-dimensional space is determined by taking the at least one geometric parameter and the one or more parameters of said two-dimensional transformation into account.

10. The method of claim 1, in which determining (5) the at least one angle of rotation also comprises determining at least one translation component, and wherein moving (6) the item and/or the radiation imaging system comprises moving the item and/or the radiation imaging system in accordance with the at least one angle of rotation and the at least one translation component.

11. The method of claim 1, wherein the at least one geometric parameter relating to the relative orientation between the simulated item, a simulated radiation source, and a simulated detection plane that varies over the plurality of simulated projection images comprises at least a first geometric parameter corresponding to a rotational and/or translational degree of freedom for moving (6) the item and/or the radiation imaging system.

12. The method of claim 11, wherein the at least one geometric parameter comprises at least a second geometric parameter corresponding to a rotational and/or translational degree of freedom of the item with respect to the radiation imaging system that is not controlled by a step of moving (6).

13. The method of claim 1, in which a step of comparing (9) the acquired projection image to the plurality of simulated projection images comprises repeatedly comparing the acquired projection image to the plurality of simulated projection images at multiple scales, wherein a different subset of said plurality of simulated projection images is associated with a different level of simulated details in the numerical model of the item at each scale, at least one subset being associated with the numerical model of said item and at least one further subset being associated with the numerical model of said at least one component of said item.

14. The method of claim 1, comprising a further step of classifying said item or at least component thereof into a predetermined set of defect classes, wherein classifying comprises applying at least an image similarity measure between the further projection image and the simulated projection image corresponding to the view of the further projection image to a classifier, said classifier having received image similarity measures between the further projection image and the simulated projection image corresponding to the view of the further projection image of a plurality of items as training data.

15. A system (20) for inspection of an item, the system comprising:
  a radiation imaging system (21) for acquiring a projection image of the item;
  a simulator or a precomputed library (22), for providing a plurality of simulated projection images of the item or at least one component thereof, based on a simulation of a numerical three-dimensional model of the item or the at least one item component, in which at least one geometric parameter relating to the relative orientation between the simulated item, a simulated radiation source, and a simulated detection plane varies over the plurality of simulated projection images;
  a processor (23), such as a graphical processing unit, for determining a relative orientation of the item with respect to the radiation imaging system, in which determining the relative orientation comprises comparing the projection image to the plurality of simulated projection images, and selecting at least one simulated projection image with the highest image similarity measure to the projection image, said processor furthermore being adapted for determining at least one angle of rotation taking a viewing angle and the determined relative orientation with respect to the selected simulated projection image into account;
  an actuator (24), controlled by said processor, for moving the item and/or the radiation imaging system in accordance with the determined at least one angle of rotation such as to position and/or orient the item and/or the radiation imaging system with respect to each other to acquire a further projection image of the item corresponding to a view of the item from the viewing angle.

16. The system of claim 15, wherein said processor is adapted for repeatedly determining the relative orientation, determining the at least one angle of rotation, moving the item, and acquiring a further projection image for one or more further viewing angles, in which a last acquired further projection image is used as the projection image on which to operate in a following repetition loop.

17. The system of claim 15, wherein said processor is adapted for determining a two-dimensional transformation between the projection image and a simulated projection image selected from the plurality of simulated projection images, said transformation being determined by numerically optimizing an image similarity measure between the projection image and the simulated projection image, wherein one or more parameters of said two-dimensional transformation are indicative of a translation and/or rotation of the item in the projection image plane.

18. The system of claim 17, wherein the processor is adapted for transforming the projection image by the two-dimensional transformation to obtain a transformed projection image in which the item is positioned and oriented as in the selected simulated projection image, and for determining a position and orientation of the item in three-dimensional space taking the one or more parameters of the two-dimensional transformation into account.

19. The system of claim 18, wherein the processor is adapted for optimizing an image similarity measure between the transformed projection image and the plurality of simulated projection images, as function of the at least one geometric parameter, to determine the at least one geometric parameter, and for determining the position and orientation of the item in three-dimensional space by taking the at least one geometric parameter and the one or more parameters of said two-dimensional transformation into account.

20. A data storage device comprising a computer program for implementing, when executed on a processor, a method in accordance with claim 1, a processor interfacing a radiation imaging system for acquiring projection images of an item and an actuator for moving the item relative to said radiation imaging system.

* * * * *